H. R. RIDGLEY.
Harness-Pad.
No. 199,225. Patented Jan. 15, 1878.
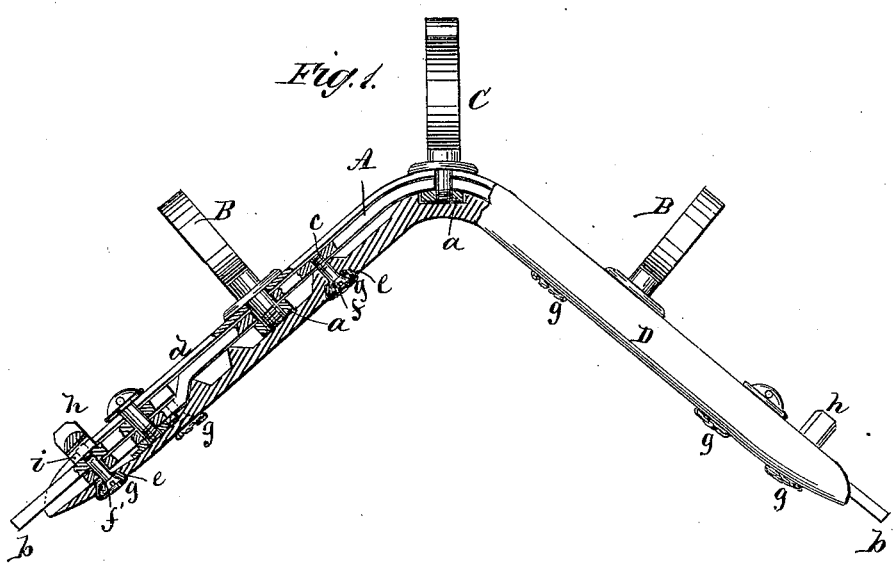
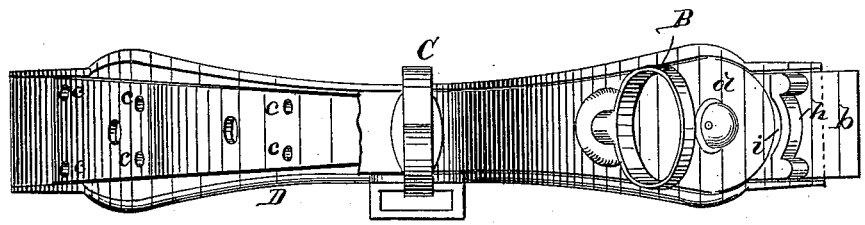
WITNESSES:
INVENTOR:

UNITED STATES PATENT OFFICE.

HIBBARD R. RIDGLEY, OF ASHLAND, OHIO.

IMPROVEMENT IN HARNESS-PADS.

Specification forming part of Letters Patent No. 199,225, dated January 15, 1878; application filed November 26, 1877.

*To all whom it may concern:*

Be it known that I, HIBBARD R. RIDGLEY, of Ashland, in the county of Ashland and State of Ohio, have invented a new and Improved Coach Harness-Pad, of which the following is a specification:

Figure 1 is a side elevation, partly in section, of my improved harness-pad. Fig. 2 is a plan view with the covering removed.

Similar letters of reference indicate corresponding parts.

My invention relates to improvements in rubber harness-pads; and it consists in a pad having recesses at the back for receiving the nuts by which the terrets are fastened to the tree, and having, also, countersunk holes for receiving tufted screws for fastening the pad to the tree.

It also consists in a novel fastening for the trace-bearing strap.

In the drawing, A is a harness-tree of the common form, having the terrets B and check-loop C secured to it by means of nuts $a$. The tree is offset at its ends to receive the trace-bearing straps $b$, and has threaded apertures $c$, for receiving the screws by which the rubber pad is fastened to the tree.

D is a soft-rubber pad, having in its upper surface a recess for receiving the tree A and the tree-covering $d$. It is also recessed to receive the nuts $a$, by which the terrets and check-loop are fastened to the tree.

Countersunk holes $e$ are formed in the rubber pad D, for receiving the screws $f$, which are each provided with a number of washers, $g$, of cloth or other fibrous or flexible material. The screws pass through the pad into the apertures $c$ in the tree, and as the cloth washers are drawn into the countersunk holes in the rubber the elasticity of the rubber causes the edges of the washers to fold over the screw-head and form a tuft which is soft and yielding.

The trace-bearing strap $b$ is secured to the tree by two screws, $f'$, that pass through the pad D, tree A, and through the strap into a curved yoke, $h$, which touches the strap only at its ends, leaving a space, $i$, under its middle portion, to receive ornamental work stitched to the face of the strap.

The outer surface of the pad is japanned in imitation of leather.

I am aware that it is not broadly new to construct an india-rubber harness-pad with a hollow back for the reception of a metallic pad-plate.

Having thus described my invention, I claim as new and desire to secure by Letters Patent—

1. A rubber harness-pad having its upper surface recessed to receive the harness-tree, and the nuts of the terrets and check-loop, and provided with countersunk holes for receiving fastening-screws, as herein shown and described.

2. The fastening-screws $f$, provided with flexible washers $g$ for fastening the rubber pad, as herein shown and described.

3. The trace-bearing-strap fastener, consisting of the curved yoke $h$ and the screw $f$, as herein shown and described.

HIBBARD REGINAL RIDGLEY.

Witnesses:
P. E. HOLBEN,
J. R. MASON.